CROSS-WIND COMPONENT COMPUTER

Filed Feb. 28, 1956 2 Sheets-Sheet 1

INVENTOR.
PARKER B. MUDGE
BY Wade Koontz and Paul M Pabulis
ATTORNEYS

Aug. 25, 1959 P. B. MUDGE 2,901,167

CROSS-WIND COMPONENT COMPUTER

Filed Feb. 28, 1956 2 Sheets-Sheet 2

INVENTOR.
PARKER B. MUDGE
BY Wade Koontz and
Paul M Pabulco
ATTORNEYS

United States Patent Office 2,901,167

Patented Aug. 25, 1959

2,901,167

CROSS-WIND COMPONENT COMPUTER

Parker B. Mudge, East Norwalk, Conn.

Application February 28, 1956, Serial No. 568,412

5 Claims. (Cl. 235—61)

(Granted under Title 35, U.S. Code (1952), sec. 266)

The invention described herein may be manufactured and used by or for the United States Government for governmental purposes without payment to me of any royalty thereon.

This invention relates to a computer, and more particularly to a computing device adapted for determining the actual cross-wind components for use, especially, in connection with aircraft cross-wind landings.

The purpose of the present invention is to provide a cross-wind component computer for providing an aircraft pilot with a quick, easy, and reliable method of computing the actual cross-wind component of a cross-wind existing, especially, at an airfield prior to making a landing.

The computer in accordance with the present invention is most valuable for use at airfields in which there are frequent changes in wind direction and speed, and in which there may be only one runway, or only one primary runway, necessitating cross-wind landings.

The computer of the present invention is further of simple construction; can be operated by one hand, leaving the operator's or pilot's other hand free to manipulate the controls of the aircraft in flight; is small enough to be easily carried in a pocket; and is simple to use, instructions on the face being self-explanatory, and provides an instantaneous computation that can be read directly from the face of the computer without requiring any extraneous computations or any interpolations. The computer of the present invention may be, further, made of plastic transparent material, of aluminum or aluminum alloy, or of any other light material.

According to the present invention, the cross-wind component computer comprises a pair of superposed, relatively rotatable discs having similar annular scales graduated in degrees and of different diameters for cooperation therewith, the lower disc being provided with additional scales in radial extent corresponding to the degrees of the annular scale thereon, and the upper disc being provided with a diametrical scale and with a window for disclosing the radial scales on the lower disc.

These and other features of the present invention are described in detail below in connection with the accompanying drawings, in which.

Figure 1:
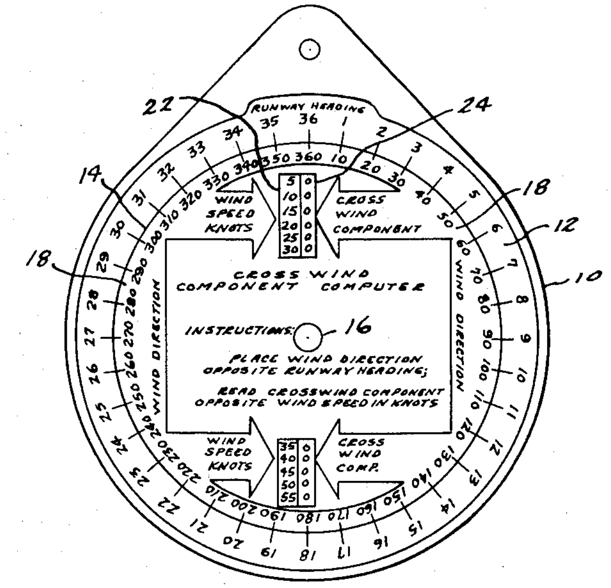
Fig. 1 is a plan view of a cross-wind component computer embodying the present invention.
Figure 2:
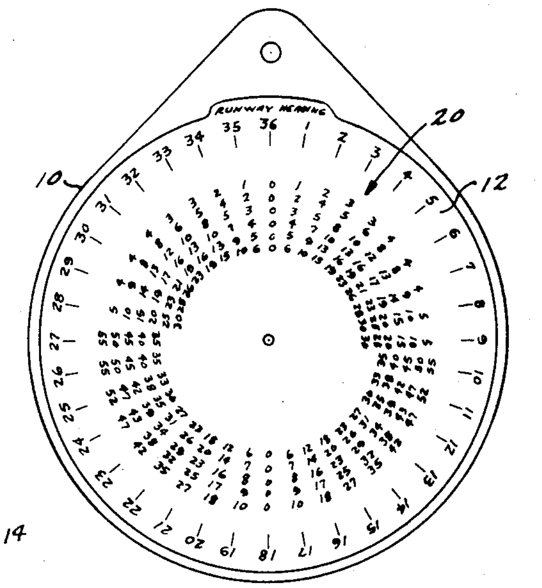
Fig. 2 is a plan view of the larger or lower disc of the computer of Fig. 1.
Figure 3:
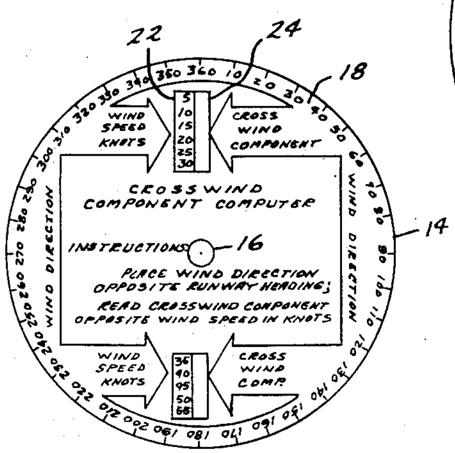
Fig. 3 is a plan view of the smaller or upper disc of the computer of Fig. 1.

Referring now to the drawings, wherein like numerals designate like parts throughout the several views, the embodiment of the cross-wind component computer of the present invention illustrated in the drawings comprises a base disc 10 circumferentially graduated from 0° to 360°, as indicated at 12, and resembling a compass rose. A second disc 14, smaller in diameter than disc 10, is superposed and concentrically, rotatably mounted on the base disc 10 by a pin 16 extending through the centers of the discs 10 and 14. The pin 16 permits relative rotation of the discs 10 and 14. The upper or superposed disc 14 is similarly graduated from 0° to 360° as indicated by reference numeral 18. The scale 12 on the face of the base disc 10 is the runway heading scale, while the scale 18 on the face of the upper disc 14 is the cross-wind direction scale. The scale 12 and 18 are arranged for cooperation by setting the runway heading on scale 12 and the cross-wind direction on scale 18.

The base disc 10 has, also, additional scales or indicia of cross-wind components 20 extending radially thereon and angularly spaced so as to correspond to the degree markings in scale 12. The scales 20 denote the cross-wind component readings, i.e., the magnitude in knots of the cross-wind component at right angle to a runway of a cross-wind as illustrated by vectors C—W.C., R.H., and C—W, respectively, in the diagram of Fig. 5.

The upper disc 14 has, also, a diametral scale 22 denoting the cross-wind speeds in knots. The disc 14 further contains a slot or window 24 extending parallel and adjacent to the cross-wind speed scale 22 for disclosing the cross-wind component readings on scales 20.

Figure 4:
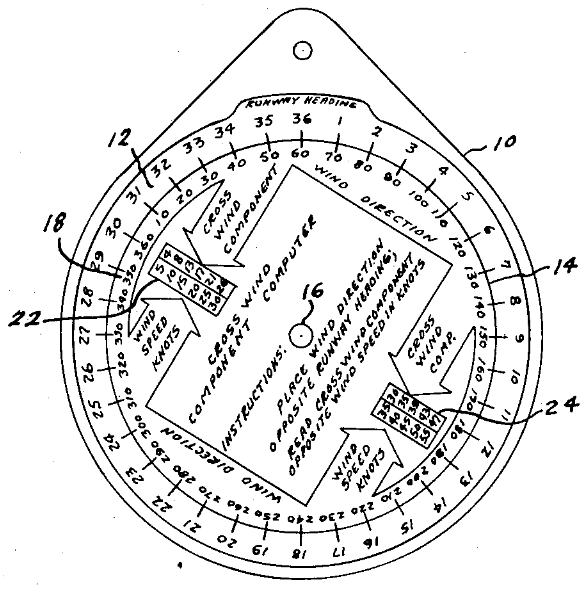
Fig. 4 is a view of the device similar to that of Fig. 1, but with the discs in position for the computation of a cross-wind component.

In the example illustrated in Fig. 4, a runway heading of 300° and a cross-wind direction from 360° are arbitrarily assumed for purposes of illustration of the operation of the computing device, and it is desired to obtain the actual cross-wind component speed for correction of an airplane heading prior to making a landing on this particular runway. Assuming that the cross-wind speed is 30 knots, first, the upper disc 14 is rotated until the 360° marking of the cross-wind scale 18 is aligned with the 300° marking of the runway heading scale 12 on the face of the base disc 10. Then opposite the cross-wind speed of 30 knots in the diametral scale 22, the actual cross-wind component speed of 26 knots is read in scale 20 disclosed through the window 24 in the upper disc 14.

Figure 5:
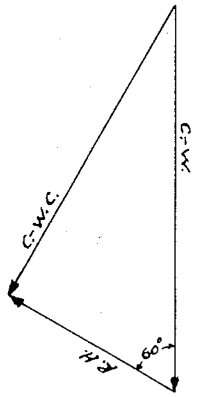
Fig. 5 is a diagram of the cross-wind component computation illustrated in Fig. 4.

The above problem is graphically illustrated in Fig. 5 in usual vector analysis form where the C—W vector represents the cross-wind direction from 360° and a speed of 30 knots; the R.H. vector represents the runway heading of 300°; and the C—W.C. vector represents the magnitude of the cross-wind component in knots. The magnitude of the cross-wind component may be obtained by the trigonometric equation $$C\text{—}W.C.=C\text{—}W.\ \text{sine}\ \theta$$

Since the cross-wind speed is assumed to be 30 knots, and the angle $\theta$, the angle between the cross-wind and runway heading vectors, is 60°, substituting these values in the above equation we can then solve for the cross-wind component as follows:

$$C\text{—}W.C.=30\ \text{sine}\ 60°$$
$$C\text{—}W.C.=(30)\ (.86603)$$
$$C\text{—}W.C.=25.9809\ \text{or}\ 26\ \text{knots}$$

The mathematical solution of the above problem demonstrates not only the accuracy of the computer but, also, the speed with which the cross-wind component speed may be obtained by employing the computer of the present invention.

It should be understood, however, that a cross-wind component at 90° to a runway is equal to the cross-wind speed, and, therefore, either the speed of the cross-wind or no reading will be indicated on the computer. As a matter of fact, since for all practical purposes a cross-wind component from 80° to 90° may be considered as equal to the cross-wind speed the computer is arranged to indicate the cross-wind speed as the component between these limits.

The present invention has been described in detail above for purposes of illustration only and is not intended to be limited by this description or otherwise except as defined in the appended claims.

I claim:

1. A universal cross-wind component computer for any runway compass heading comprising a base disc having a compass rose scale marked thereon for denoting runway compass heading, a second disc pivoted at the center on said base disc for relative rotation thereto, said second disc having a compass rose scale of lesser diameter marked thereon for indicating actual compass wind directions for cooperation with the first-mentioned scale and a diametral scale of cross-wind speed marked thereon, said base disc having angularly spaced indicia of cross-wind components relative to 0° runway compass heading corresponding to the compass rose scale thereon, and said second disc having a window therein for disclosing the correct cross-wind component indicia on said base disc corresponding to the cross-wind scale when the correct runway compass heading degree indicia is set opposite the correct compass wind direction on the rose scales.

2. In a computer for determining cross-wind components with respect to a runway compass heading, the combination comprising a base disc having a compass rose scale for runway compass heading settings, a disc superposed and pivotally mounted at the center on said base disc for relative rotation thereto, said upper disc having a compass rose scale of a lesser diameter for indicating wind compass direction heading settings, said base disc having a plurality of radially spaced scales, each of said radially spaced scales having angularly spaced indicia of cross-wind components corresponding to a specific cross-wind speed, and said upper disc being provided with radially spaced indicia of cross-wind speeds with each speed being disposed on the same radius as the radially spaced scale of the base disc, said upper disc having window means adjacent the indicia of cross-wind speeds for disclosing the corresponding cross-wind component indicia on said base disc.

3. A computer comprising a first disc having marginal compass scale markings from 0° to 360° for runway compass heading settings, a second disc of lesser diameter concentrically superposed and pivotally mounted on said first disc for relative rotation thereto, said second disc having marginal compass scale markings from 0° to 360° for wind heading direction compass settings, said first disc having rows of cross-wind component scales in radial spaced relation to each other and extending inwardly from the runway heading compass scale thereof, and said second disc being provided with a diametral cross-wind speed scale and a window therein parallel to said wind speed scale for disclosing the correct cross-wind component scale corresonding to runway and cross-wind compass heading settings for reading opposite an actual cross-wind speed its corresponding cross-wind component.

4. A computer for determining cross wind components with respect to any predetermined runway compass heading comprising, a base disk having a compass rose 360° scale for denoting runway compass heading directions, a concentric second disk superimposed on and rotatably mounted about the center of said base disk having a 360° compass rose scale thereon disposed for comparative setting relation to the first compass rose scale and denoting compass direction of the winds, said base disk having circumferentially spaced radial scales aligned with the compass rose degree indicia thereon for indicating actual runway cross-winds speed components relative to predetermined runway compass heading degree indicia thereon, said radial scales denoting radially spaced increasing cross-wind speeds, said upper disk having a radial window extending in a diametrical direction between the 180° and 360° indicia thereon for simultaneously displaying a selected radial row of the cross-wind speed components corresponding to the setting of the corresponding runway heading degree indicia radially opposite to the wind compass direction heading, and a plurality of different actual wind speed indicating indicia disposed adjacent said radial window for selection of one of the radially spaced cross-wind speed component indicia on the base disk, to denote actual cross-wind speed components relative to actual runway compass heading and wind speed.

5. A computer for indicating actual cross-wind speed components with respect to any predetermined aircraft runway compass heading comprising, a first circular base disk having a compass rose adjacent its periphery divided circumferentially to indicate from 0° to 360° for indicating predetermined runway compass heading directions, a second circular disk concentrically pivoted on the first disk for rotative adjustment and having a similar concentric circular ring of compass rose degree indicating indicia lying in radially spaced adjacent relation to the runway heading degree indicia on the first disk and indicating 360° for indicating actual wind compass directions in degrees, said second disk having a window slit therein extending diametrically between the pivotal center and the 180° and 360° indicia, increasing actual wind speed indicating indicia adjacent the edge of said window reading in direction from said 360° to said 180° indicia on the second disk to indicate actual different wind speeds independent of heading or aircraft speed; said first disk having a plurality of concentric circular rows of cross-wind speed component indicia, each circular row disposed to register with a predetermined one of the actual wind speed indicia adjacent the slit window, and indicating actual cross-wind speed components on the first disk for different degrees indicated on the first disk compass rose relative to zero 180° runway heading, said wind speed component indicia on the first disk disposed in rows of radially spaced cross-wind speed component indicia for indicating actual cross-wind speed components for different wind speeds, each row being disposed for registration with the actual wind-speed indicia aforesaid adjacent the window slit, whereby when a selected cross-wind compass direction degree on the second disk is set opposite the actual compass direction runway heading direction on the first disk the actual cross-wind speed component relative to runway heading is displayed in the window opposite the indicated actual wind speed indication adjacent the window slot.

References Cited in the file of this patent

UNITED STATES PATENTS

| | | |
|---|---|---|
| 1,428,449 | Prall | Sept. 5, 1922 |
| 1,456,155 | Slauson | May 22, 1923 |
| 2,244,125 | Siefker | June 3, 1941 |
| 2,413,314 | Cruzan | Dec. 31, 1946 |
| 2,506,299 | Isom | May 2, 1950 |
| 2,534,288 | Merriam | Dec. 19, 1950 |
| 2,585,618 | Batori | Feb. 12, 1952 |
| 2,623,696 | Thrash | Dec. 30, 1952 |